(12) United States Patent
Saitou et al.

(10) Patent No.: US 10,191,473 B2
(45) Date of Patent: Jan. 29, 2019

(54) JOB PLAN DISPLAY SYSTEM

(71) Applicant: TOYOTA JIDOSHA KABUSHIKI KAISHA, Toyota-shi, Aichi-ken (JP)

(72) Inventors: Toru Saitou, Miyoshi (JP); Hideyuki Tagami, Anjo (JP); Takashi Yasuma, Nisshin (JP); Katsuhiro Ito, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 657 days.

(21) Appl. No.: 14/627,633

(22) Filed: Feb. 20, 2015

(65) Prior Publication Data

US 2015/0261209 A1    Sep. 17, 2015

(30) Foreign Application Priority Data

Mar. 13, 2014  (JP) .................. 2014-050575

(51) Int. Cl.
   *G05B 19/4097*    (2006.01)
   *G05B 19/418*    (2006.01)

(52) U.S. Cl.
   CPC ....... *G05B 19/4097* (2013.01); *G05B 19/418* (2013.01); *G05B 2219/32128* (2013.01); *G05B 2219/35012* (2013.01); *Y02P 90/20* (2015.11); *Y02P 90/265* (2015.11)

(58) Field of Classification Search
   CPC ................................. G05B 19/4097
   USPC ....................................... 715/772
   See application file for complete search history.

(56) References Cited

U.S. PATENT DOCUMENTS

| 6,236,399 | B1 | 5/2001 | Nishiyama et al. |
| 2009/0030661 | A1* | 1/2009 | Bouffiou ......... G05B 19/41865 703/2 |
| 2012/0035975 | A1* | 2/2012 | Sugimoto ............. G06Q 10/06 705/7.26 |

FOREIGN PATENT DOCUMENTS

| EP | 2019371 A1 | 1/2009 |
| JP | H09245066 A | 9/1997 |
| JP | 2007233762 A | 9/2007 |
| JP | 2014063293 A | 4/2014 |
| JP | 2014119871 A | 6/2014 |
| JP | 5609600 B2 | 10/2014 |
| JP | 2014222409 A | 11/2014 |

(Continued)

OTHER PUBLICATIONS

Japanese Patent Application No. 2014050566 dated Mar. 13, 2014.
Japanese Patent Application No. 2014052467 dated Mar. 14, 2014.

*Primary Examiner* — Tadesse Hailu
*Assistant Examiner* — Darrin Hope
(74) *Attorney, Agent, or Firm* — Oliff PLC

(57) ABSTRACT

Provided is a job plan display system capable of displaying a job plan on a product, and displaying a thumbnail as image information on the product on a display area of the job plan based on design data of the product, allowing an appropriate thumbnail to be displayed while suppressing an increase in system load. The job plan display system is configured to determine whether or not to display or update the thumbnail on a display area of the job plan based on at least one of intention of a designer who created the design data, such intention being assigned to the design data of the product, a predetermined update time, progress information on the design data created and a relationship between a changing part of the design data when the design data is changed and viewpoint coordinates when creating the thumbnail.

7 Claims, 8 Drawing Sheets

(56) References Cited

FOREIGN PATENT DOCUMENTS

| JP | 2015-176239 A | 10/2015 |
|----|---------------|---------|
| JP | 2015-176357 A | 10/2015 |

* cited by examiner

FIG. 3

| Overall line | | | | | Year, Month, Date | | | | | | | | | | | | | |
|---|---|---|---|---|---|---|---|---|---|---|---|---|---|---|---|---|---|---|
| B | All operators | | | A | B | | C | | D | | E | | F | | | | | |
| Manufacturing No. | Figure No. Product No. | Process No. | Setup type | Machine time | 8 | 9 | 10 | 11 | 12 | 13 | 14 | 15 | 16 | 17 | 18 | 19 | 20 | 21 | 22 | 23 |
| 000001 | 001 | 010 | α | 2:00 | | | | | | | | | | | | | | | | |
| 000001 | 001 | 020 | β | 0:30 | | | | | | | | | | | | | | | | |
| 000001 | 001 | 030 | α | 2:30 | | | | | | | | | | | | | | | | |
| 000001 | 002 | 010 | γ | 1:30 | | | | | | | | | | | | | | | | |
| 000001 | 002 | 020 | γ | 3:00 | | | | | | | | | | | | | | | | |
| | | | | | | | | | | | | | | | | | | | | |
| 000002 | 002 | 010 | α | 1:00 | | | | | | | | | | | | | | | | |
| 000002 | 002 | 020 | γ | 1:30 | | | | | | | | | | | | | | | | |

JOB PLAN DISPLAY SYSTEM

BACKGROUND

Technical Field

The present invention relates to a job plan display system, and relates to a job plan display system to display a job plan of a NC (Numerical Control) job by a NC machine tool in a manufacturing process of production facilities, for example.

Background Art

Conventionally production facilities to manufacture various components such as motors, batteries, and semiconductors used for vehicles or the like are manufactured by preparing a plurality of components of the production facility using NC machine tools individually and assembling such a plurality of components.

In recent years, to manufacture these components of production facilities, a plurality of NC machine tools are disposed along a plurality of processing lines, and the operating state of these NC machine tools disposed along the processing lines are collectively controlled by a central computer (Direct Numerical Control (DNC)), so as to shorten the lead time to manufacture the production facilities and suppress their manufacturing cost. Management data of the plurality of NC machine tools under the DNC, such as the processing state, is displayed simultaneously on a screen of the central computer, allowing a supervisor, an operator or the like to check the processing state of the NC machine tools at one time.

In such a production facility manufacturing process, it is requested to display a job plan created for each NC machine tool under the DNC on a screen so as to allow a supervisor, an operator or the like to understand the job target and the job content of each NC machine tool easily and speedily from the screen, and Patent Document 1 discloses a conventional technique to respond to such a request.

The conventional technique disclosed in Patent Document 1 is to create a reference process table which tabulates each reference process necessary for manufacturing each component and a condition determining table which describes a condition determining expression for determining whether or not each reference process is generated using an external function, extract a factor to be a job factor from at least CAD information, component information and job information, decide job content to be generated by comparing the reference processes read from the reference process table with the extracted factor, arrange the reference processes, read the condition determining table into a process generation determining unit making a different decision for each process, determine the presence or not of the process generation by the condition determining expression to automatically set a manufacturing process, and then create a component thumbnail as image information.

RELATED ART DOCUMENT

Patent Document

Patent Document 1: JP 2007-233762 A

SUMMARY

According to the conventional technique disclosed in Patent Document 1, a component thumbnail is created as image information, enabling creation of the state of assembling/disassembling processes as viewer data from the component attachment state (network) at each process that is created automatically, which allows a manufacturing department to confirm the processes such as mechanical processing, disassembling and assembling on a CAD screen.

In the conventional technique as disclosed in Patent Document 1, however, when design data (CAD data) of each component is saved or updated, the component thumbnail also is correspondingly updated and replaced for displaying, which causes a problem of an increase in system load or another problem that the component thumbnail is updated or replaced unfortunately on the basis of CAD data that is created by the designer of the CAD data preliminarily for review or the like.

In the conventional technique as disclosed in Patent Document 1, there may be a case where a changing part of design data (CAD data) of each component does not appear on the thumbnail. In such a case, if the designer changes the design data, the component thumbnail, which does not have to be updated, also will be updated or replaced, causing a problem of a further increase in system load.

In view of these problems, the present invention aims to provide a job plan display system configured to display a job plan on a product, and to display a thumbnail as image information on the product on a display area of the job plan on the basis of design data of the product, and that is capable of displaying an appropriate thumbnail while suppressing an increase in system load.

To achieve the aim, a job plan display system of the present invention is configured to display a job plan including a plurality of unit jobs relating to manufacturing of a product, and to display a thumbnail as image information on the product on a display area of the job plan on a basis of design data of the product. The job plan display system is configured to determine whether or not to display or update the thumbnail on a basis of at least one of intention of a designer who created the design data, the intention being assigned to the design data of the product, a predetermined update time, progress information on the design data created and a relationship between a changing part of the design data when the design data is changed and viewpoint coordinates when creating the thumbnail.

According to the job plan display system as stated above, a determination is made whether or not to display or update the thumbnail of the product on a basis of at least one of intention of a designer who created the design data, the intention being assigned to the design data of the product as the manufacturing target, a predetermined update time, progress information on the design data created and a relationship between a changing part of the design data when the design data is changed and viewpoint coordinates when creating the thumbnail, which enables the thumbnail of the product to be displayed or updated at an appropriate timing in accordance with the progress, the level of completion or the like of the design data created, and so allows an appropriate thumbnail to be displayed while suppressing an increase in system load. This means that a supervisor, an operator or the like can grasp the job target or the job content of each NC machine tool easily and precisely from the display screen, for example, and so the workability of production facility manufacturing can be greatly improved, for example.

The job plan display system as stated above is configured to display, on a display area of the unit job of the job plan, the thumbnail of the product as a job target of the unit job.

According to the job plan display system as stated above, the thumbnail of the product as a job target of the unit job is displayed on a display area of the unit job of the job plan, which allows a supervisor, an operator or the like to grasp the product as the job target of the unit product of the job plan or the job content easily and reliably from the display screen, for example, and so the workability of production facility manufacturing can be further improved, for example.

The job plan display system as stated above is configured to create the thumbnail on a basis of coordinates information on the design data.

According to the job plan display system as stated above, the thumbnail of the product is created on the basis of coordinates information on the design data of the product as the manufacturing target, meaning that the thumbnail corresponding to the product as the manufacturing target can be created, enabling a supervisor, an operator or the like to grasp the job target or the job content of each NC machine tool easily and precisely from the display screen, for example, and so the workability of production facility manufacturing can be further improved, for example.

As can be understood from the above descriptions, the job plan display system of the present invention is configured to display a job plan on a product, and to display a thumbnail as image information on the product on a display area of the job plan on the basis of design data of the product, and is capable of displaying an appropriate thumbnail while suppressing an increase in system load. This allows a supervisor, an operator or the like to grasp the job target or the job content of each NC machine tool easily and precisely from the display screen, for example, and so the workability or the working efficiency of production facility manufacturing can be greatly improved, for example.

BRIEF DESCRIPTION OF THE DRAWINGS

FIG. 3 illustrates another exemplary job plan created by the scheduling creation unit of FIG. 1.

DETAILED DESCRIPTION OF THE EMBODIMENT(S)

The following describes embodiments of the present invention, with reference to the drawings. The following mainly and specifically describes a job plan display system to create and display a job plan for each NC machine tool in the production facility manufacturing process to manufacture a production facility that manufactures products as a manufacturing target using a plurality of NC machine tools disposed at a plurality of processing lines.

Embodiment 1

Figure 1:
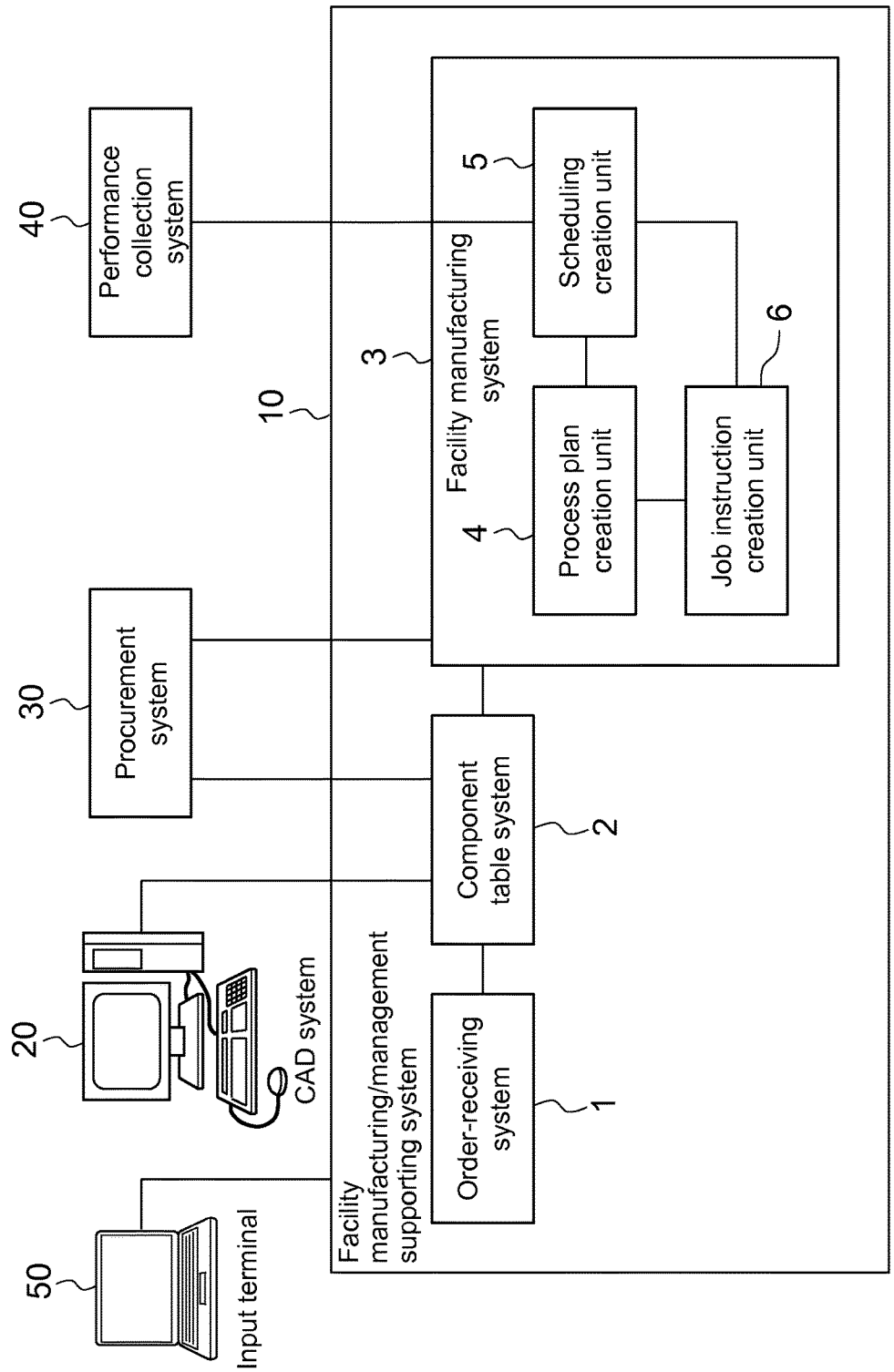
FIG. 1 illustrates the basic configuration of a facility manufacturing/management supporting system, to which a job plan display system that is Embodiment 1 of the present invention is applied.

FIG. 1 illustrates the basic configuration of a facility manufacturing/management supporting system, to which the job plan display system that is Embodiment 1 of the present invention is applied. A facility manufacturing/management supporting system 10, for example, works together with a CAD system 20 to create design data (CAD data) on a facility or a machine to be manufactured or their components, a procurement system 30 to create procurement data on orders and purchase of materials and components to be used, a performance collection system 40 to collect actual performance data on the jobs, such as the starting or the completion of a job, the operating time required for the job, and an operator performing the job, to support the manufacturing of the facility and the machine or the management of them. The facility manufacturing/management supporting system 10 is connected to an input terminal 50, allowing an operator, a supervisor or the like to input various types of data and displaying calculation results, job instructions and the like to an operator, a supervisor or the like.

The illustrated facility manufacturing/management supporting system 10 mainly includes: an order-receiving system 1 that processes a manufacturing request and assigns a management number, for example; a component table system 2 that creates a list on facilities or machines to be manufactured and their components or drawings, for example, on the basis of information created by the order-receiving system 1, design data created by the CAD system 20 and procurement data created by the procurement system 30; and a facility manufacturing system 3 that creates a manufacturing plan of each manufacturing line or processing line and job instructions to operators or the like on the basis of the information created by the component table system 2, the procurement data created by the procurement system 30 and the like.

The facility manufacturing system 3 in the facility manufacturing/management supporting system 10 further includes: a process plan creation unit 4 that creates a process plan on job processes such as "component manufacturing (processing)", "unit manufacturing (sub-assembling)", and "general assembling" on the basis of the information (information on facilities or machines to be manufactured and their components) created by the component table system 2, the procurement data created by the procurement system 30 and the like; a scheduling creation unit (job plan display system) 5 that creates and display a job plan on jobs by an operator or the like at each job process; and a job instruction creation unit 6 that creates an instruction sheet to an operator or the like on the basis of the process plan and the job plan created by the process plan creation unit 4 and the scheduling creation unit 5.

Figure 2:
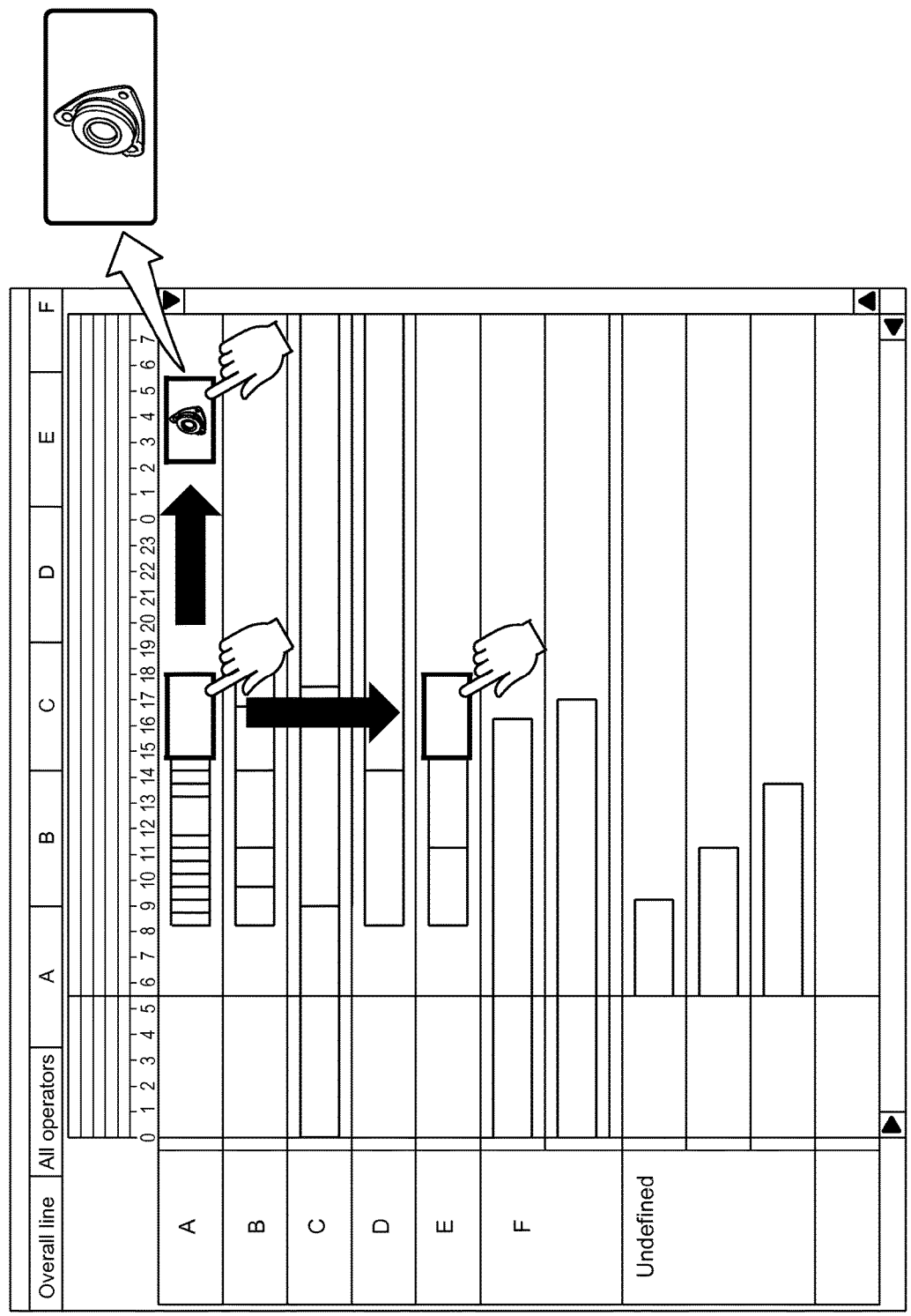
FIG. 2 illustrates an exemplary job plan created by the scheduling creation unit of FIG. 1.

FIG. 2 illustrates an exemplary job plan created by the scheduling creation unit 5 of FIG. 1. In FIG. 2, the vertical axis mainly represents identification symbols of the NC machine tools disposed at each processing line, and the horizontal axis represents the plan (date and time), where each unit job in the job plan created by the scheduling creation unit 5 is represented as rectangular blocks ("job bars") by the NC machine tool. An "undefined" region located at a lower part of FIG. 2 displays jobs that are not allocated to any NC machine tool at the planning stage. For instance, jobs such as an unexpected job due to design change or an important job that are to be planned while changing the plan flexibly (e.g., changing the plan manually) depending on the situation at that time, and not to be incorporated automatically into the job plan, are displayed in this "undefined" region.

The job plan illustrated in FIG. 2 is displayed on a touch panel screen, for example, enabling an operator or the like to change the job plan by an operation such as tapping and sliding at the operator's demand. For instance, an operator or the like can perform operations such as tapping and sliding thereto to assign a certain job of a certain NC machine tool to another NC machine tool or to change the operating time or the delivery time of a certain job of a certain NC machine tool.

The job plan illustrated in FIG. 2 can be displayed on a screen as a job plan for each NC machine tool as illustrated in FIG. 3, in response to a predetermined operation (e.g., selection of a tab disposed at an upper part of FIG. 2 or selection of the fields of the NC machine tools along the vertical axis) by an operator, a supervisor or the like. At this time, the operator or the like can perform operations such as tapping and sliding to make a plan (assign) of a job that is displayed at the "undefined" region at a desired time for (to) the corresponding NC machine tool. Alternatively the operator or the like can perform operations such as tapping and sliding to move a part of the jobs planed for the NC machine tools to the "undefined" region.

For easy grasping or understanding of the job target or the job content of each NC machine tool by the supervisor, the operator or the like, a thumbnail as image information (image data) of the product is displayed on a display area (in a "job bar") of the unit job on the job plan illustrated in FIG. 2 or FIG. 3 (especially see FIG. 2) on the basis of design data (CAD data) of the product as a job target (manufacturing target) of the unit job. The "job bar" on which a thumbnail is displayed, can be set appropriately based on the importance, the urgency (delivery time) and the shape of the product as the manufacturing target, the size of the "job bar" and the like.

Figure 4:
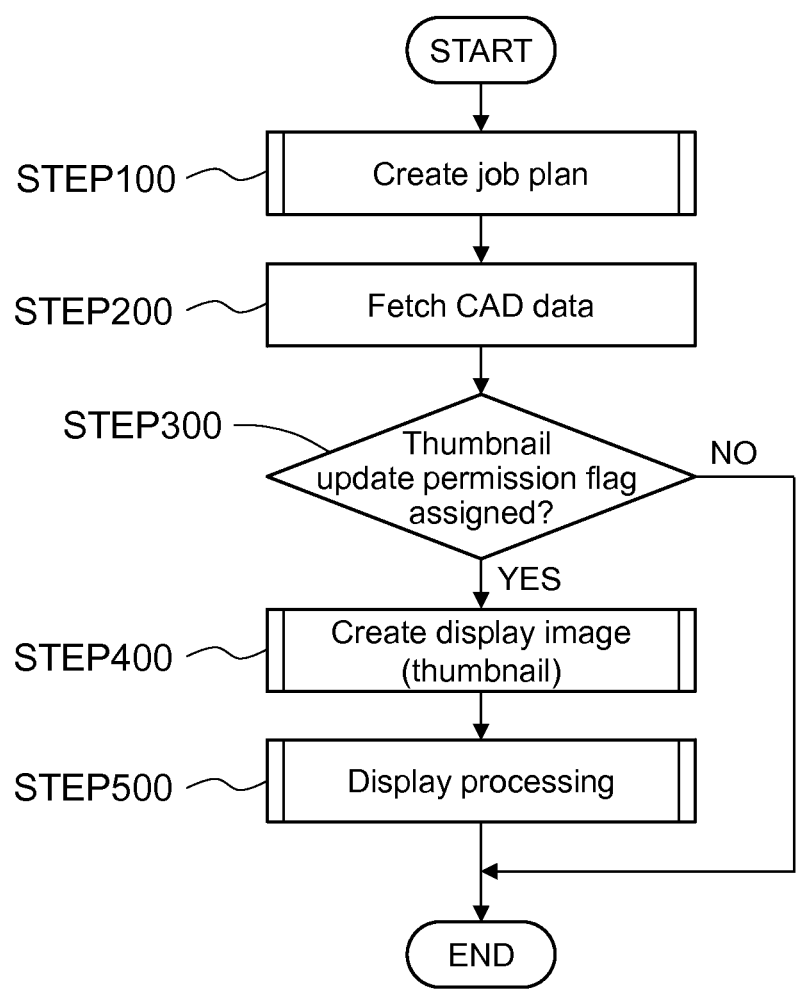
FIG. 4 is a flowchart to describe the display processing flow by the scheduling creation unit of FIG. 1.

Referring now to FIG. 4, the following describes a method for displaying a job plan by the scheduling creation unit (job plan display system) 5 in FIG. 1, and especially describes a method for displaying a thumbnail at a "job bar" on the job plan specifically. The scheduling creation unit 5 is configured to reconfigure a job plan of each unit job on the basis of the progress of the jobs transmitted from the performance collection system 40 after the completion of the jobs that day and by the job starting time of the following day, for example, and displays the job plan on the display device, for example, of the input terminal 50.

If a thumbnail displayed in a "job bar" is updated or replaced every time design data (CAD data) is saved or updated, the thumbnail will be updated or replaced on the basis of the CAD data, which may be a CAD data as a preliminary data created by the designer of the CAD data for review, for example. To avoid this, the scheduling creation unit 5 is configured to determine whether or not to display or update a thumbnail in a "job bar" on the basis of the intention of the designer who created the CAD data, such intention being assigned to the CAD data of the product as a manufacturing target.

Specifically as illustrated in FIG. 4, the scheduling creation unit 5 firstly creates a job plan for each NC machine tool on the basis of information transmitted from the component table system 2, the procurement system 30, the performance collection system 40 and the like, the job plan including a plurality of unit jobs to manufacture a production facility that manufactures products as a manufacturing target (STEP 100).

Next, the scheduling creation unit 5 fetches CAD data of a product as a job target of each unit job that is created by the designer (STEP 200). Herein when the designer considers that the CAD data fetched can be used as a thumbnail, the designer assigns a "thumbnail update permission flag" beforehand to the CAD data. The CAD data, to which the "thumbnail update permission flag" is assigned, meaning that displaying or updating of the thumbnail is permitted, may contain accessory information on the product, such as a product number or an additional code assigned thereto. The "thumbnail update permission flag" may be assigned to the CAD data after the designer changes the CAD data and based on the determination by the designer as to whether or not to assign the flag based on the degree of the change or the changing point, for example, or the designer may assign the flag prior to the change of CAD data. Specifically, an "update permission button" may be configured on the display screen of the CAD system 20, allowing the designer to click the "update permission button" after changing the CAD data to be updated to assign the "thumbnail update permission flag". In that case, the scheduling creation unit 5 detects a signal on the "update permission button" (a signal indicating that the designer clicked the "update permission button") and can fetch the CAD data only when such a signal is detected.

Next, the scheduling creation unit 5 determines whether the CAD data fetched regularly at STEP 200 has a "thumbnail update permission flag" assigned or not (STEP 300), and when it is determined that the "thumbnail update permission flag" is not assigned, the scheduling creation unit 5 determines that the designer does not intend to update a thumbnail based on the CAD data, and ends the procedure. That is, when it is determined that the "thumbnail update permission flag" is not assigned, a new thumbnail is not displayed or updated. If a thumbnail created before is present, such a thumbnail is displayed in a "job bar" on the job plan.

On the other hand, when it is determined that the "thumbnail update permission flag" is assigned, the scheduling creation unit 5 determines that the designer intends to update a thumbnail based on the CAD data, and creates a display image (thumbnail) on the basis of coordinates information of the CAD data (STEP 400). Specifically the scheduling creation unit 5 sets viewpoint coordinates (coordinates serving as a viewpoint for viewing of a product) based on the coordinates information of the CAD data, and converts the shape of the product as the manufacturing target when viewed from the thus set viewpoint coordinates into image information (image data) using the CAD data to create the thumbnail. Herein, the viewpoint coordinates that are used to create the thumbnail can be automatically selected using a "shape characteristic mining technique" or the like so that the shape characteristic of the product as the manufacturing target can be best described. It is desirable that a supervisor, an operator or the like can input the viewpoint coordinates as needed using the input terminal 50 or the like. Changing of the viewpoint coordinates freely enables the displaying of an internal (structural) viewing at the beginning of the job and then displaying of an outside viewing in the middle of the job. This allows switching (correctly using) of display (thumbnail) for a characteristic part between the stage to process the inside of a product as a job target and the stage to process the outside, allowing the operator to imagine the target component or process more intuitively and so enhancing the workability or working/processing efficiency of the production facility manufacturing.

Then the scheduling creation unit 5 displays the thumbnail of an appropriate size (thumbnail relating to the product as a job target of the unit job) created at STEP 400 in the "job bar" representing the unit job of the job plan created at STEP 100 (STEP 500) and ends the procedure. When any thumbnail created before exists in the "job bar", such a thumbnail is updated with the thumbnail newly created at STEP 400 for displaying.

In this way, according to Embodiment 1, a thumbnail in a "job bar" is displayed or updated on the basis of the intention of the designer who created the CAD data, such intention being assigned to the design data (CAD data) of the product as a manufacturing target. This allows the thumbnail describing the feature of the product to be displayed or updated at an appropriate timing in accordance with the progress, the level of completion or the like of the design data created, and so allows an appropriate thumbnail to be displayed while suppressing an increase in system load. This means that a supervisor, an operator or the like can grasp the job target or the job content of each NC machine tool easily and precisely from the display screen, and so the workability of production facility manufacturing can be greatly improved.

Embodiment 2

Figure 5:
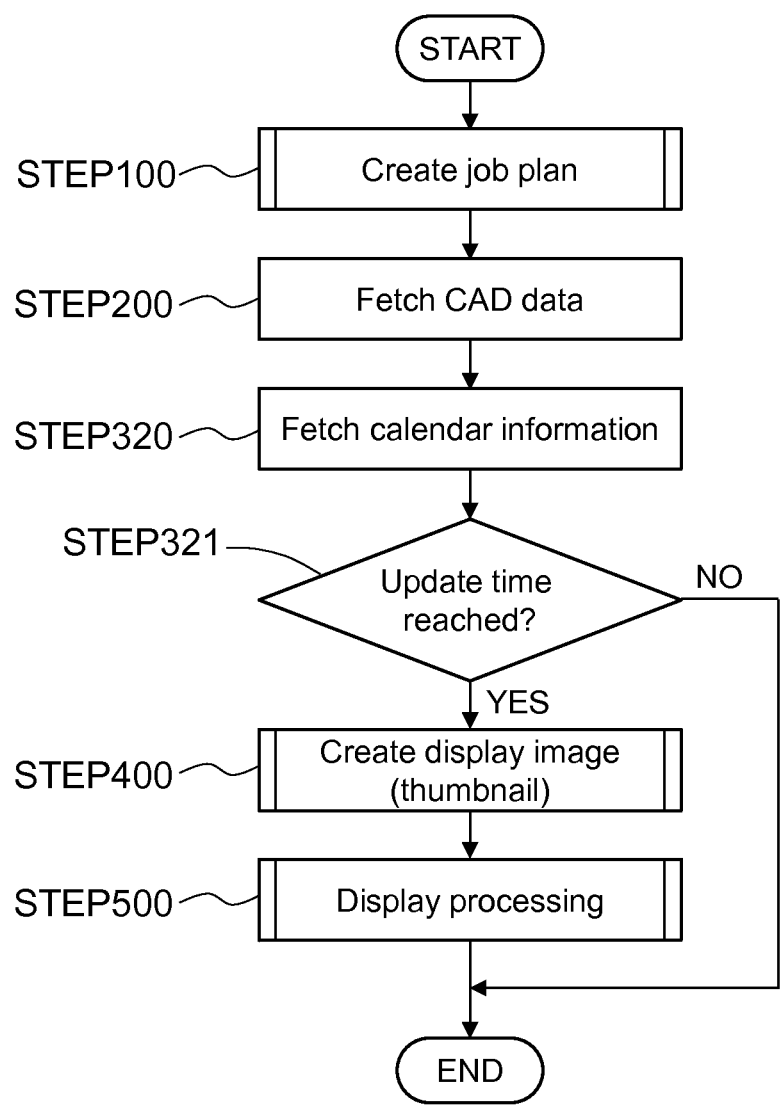
FIG. 5 is a flowchart to describe the display processing flow by a job plan display system that is Embodiment 2 of the present invention.

FIG. 5 is a flowchart to describe a display processing flow by a job plan display system (scheduling creation unit 5) that is Embodiment 2 of the present invention. Embodiment 2 is configured so that, instead of the intention of the designer who created the CAD data, a determination as to whether or not to display or update a thumbnail in a "job bar" is made based on a predetermined update time. The other configuration is substantially similar to that of Embodiment 1 as stated above, and so similar reference numerals are assigned to the configuration similar to Embodiment 1, and their detailed descriptions are omitted.

As illustrated in FIG. 5, similarly to Embodiment 1 as stated above, the scheduling creation unit 5 of Embodiment 2 firstly creates a job plan for each NC machine tool on the basis of information transmitted from the component table system 2, the procurement system 30, the performance collection system 40 and the like, the job plan including a plurality of unit jobs to manufacture a production facility that manufactures products as a manufacturing target (STEP 100). Next, the scheduling creation unit 5 fetches CAD data of a product as a job target of each unit job that is created by the designer (STEP 200).

In Embodiment 2, "calendar information" containing a predetermined update time is stored beforehand at a predetermined position, and so the scheduling creation unit 5 fetches the "calendar information" containing the update time (STEP 320). The update time in the "calendar information" used may be a date and time such as "a releasing date of drawing" that can be a milestone for the designing.

Next, the scheduling creation unit 5 determines whether the update time reaches or not based on the "calendar information" fetched at STEP 320 and the current date and time (STEP 321), and when it is determined that the update time does not reach, the scheduling creation unit 5 determines that it is not the timing to update a thumbnail, and ends the procedure.

On the other hand, when it is determined that the update time reached, the scheduling creation unit 5 determines that it is the timing to update a thumbnail, and creates a display image (thumbnail) on the basis of coordinates information of the CAD data fetched at STEP 200 (STEP 400).

Then the scheduling creation unit 5 displays the thumbnail (thumbnail relating to the product as a job target of the unit job) created at STEP 400 in the "job bar" representing the unit job of the job plan created at STEP 100 (STEP 500) and ends the procedure. When any thumbnail created before exists in the "job bar", such a thumbnail is updated with the thumbnail newly created at STEP 400 for displaying.

In this way, according to Embodiment 2, a thumbnail in a "job bar" is displayed or updated on the basis of the predetermined update time relating to the designing, such as "a releasing date of drawing". This allows the thumbnail describing the feature of the product to be displayed or updated at an appropriate timing in accordance with the progress, the level of completion or the like of the design data created, and so allows an appropriate thumbnail to be displayed while suppressing an increase in system load.

Embodiment 3

Figure 6:
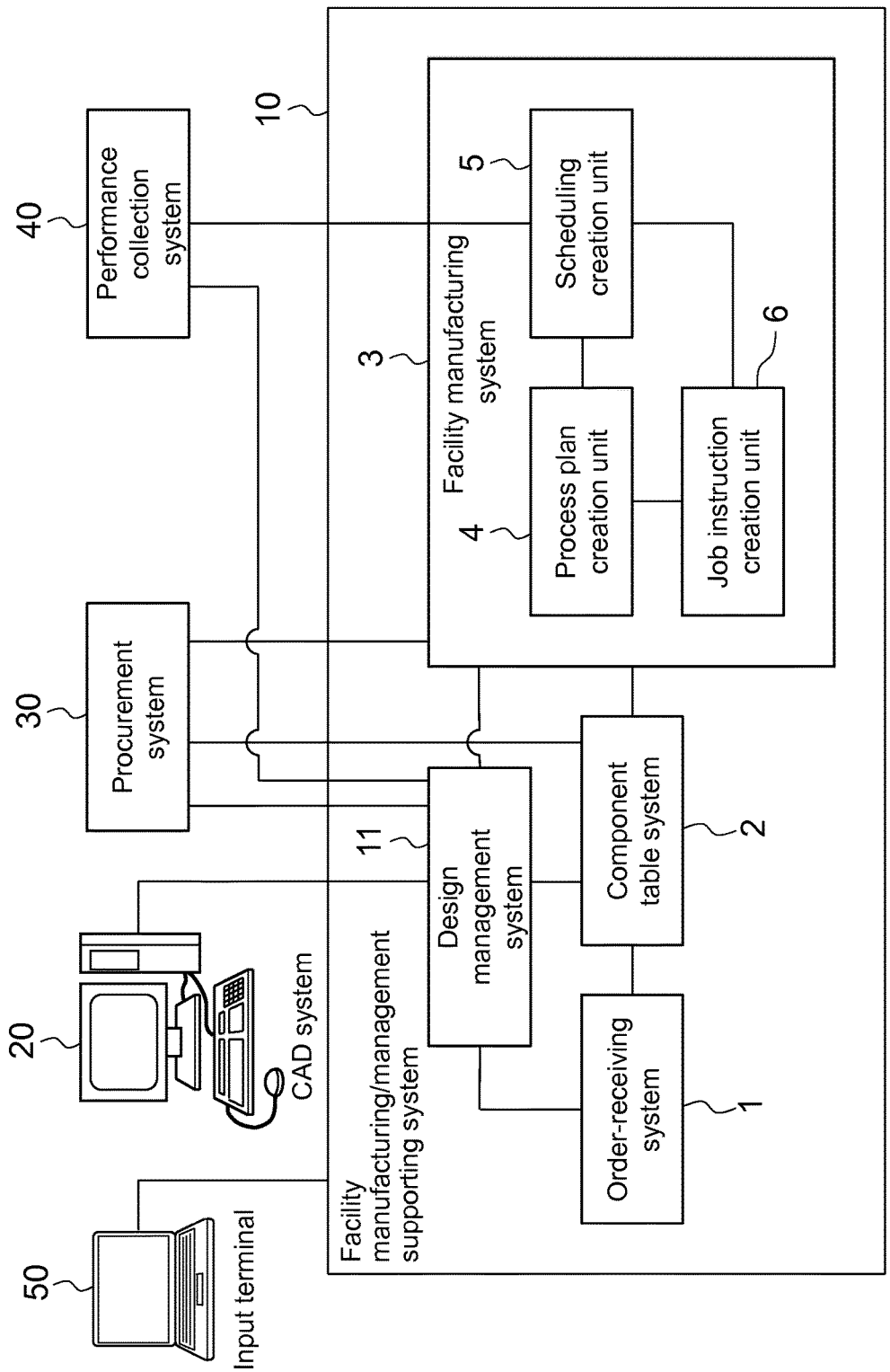
FIG. 6 illustrates the basic configuration of a facility manufacturing/management supporting system, to which a job plan display system that is Embodiment 3 of the present invention is applied.
Figure 7:
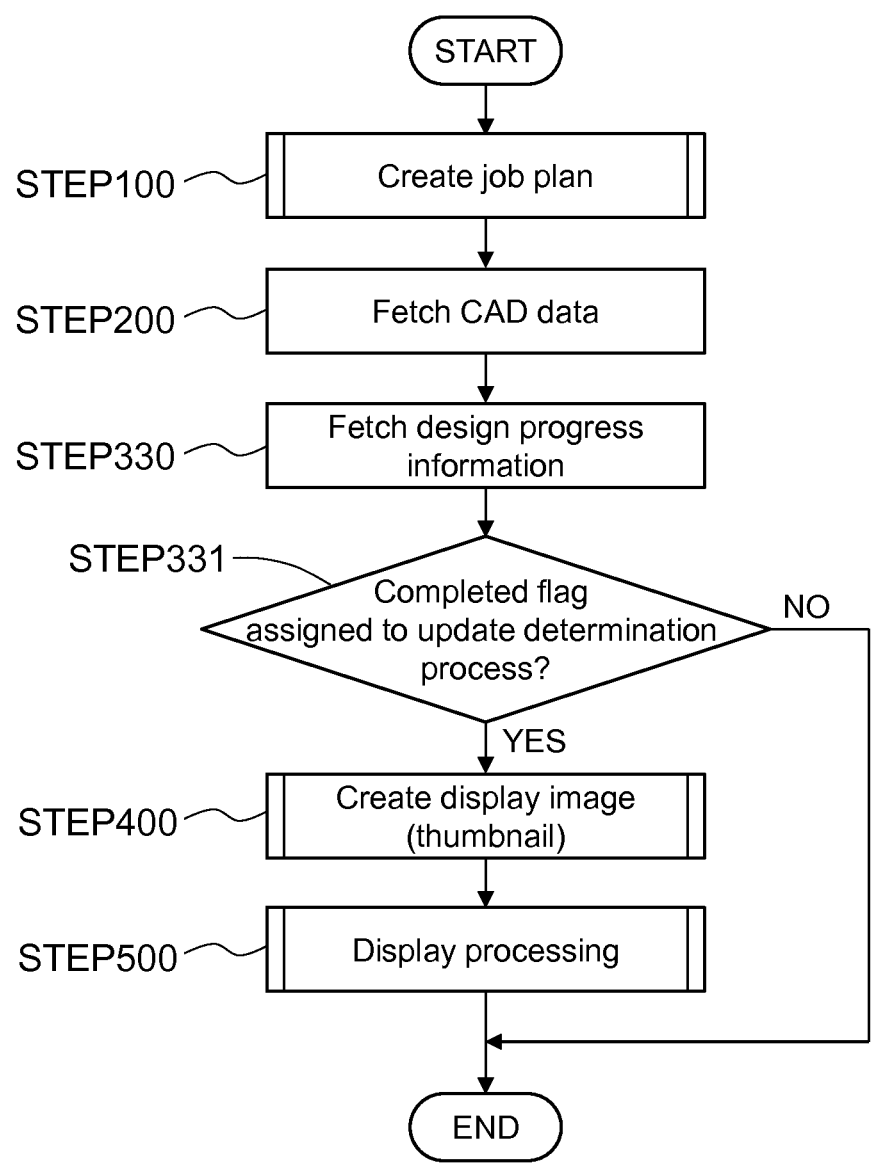
FIG. 7 is a flowchart to describe the display processing flow by the scheduling creation unit of FIG. 6.

FIG. 6 illustrates the basic configuration of a facility manufacturing/management supporting system, to which a job plan display system (scheduling creation unit 5) that is Embodiment 3 of the present invention is applied, and FIG. 7 is a flowchart to describe a display processing flow by the scheduling creation unit in FIG. 6. Embodiment 3 is configured so that, instead of the intention of the designer who created the CAD data or the predetermined update time, a determination as to whether or not to display or update a thumbnail in a "job bar" is made based on the progress information on design data created. The other configuration is substantially similar to that of Embodiments 1 and 2 as stated above, and so similar reference numerals are assigned to the configuration similar to Embodiments 1 and 2, and their detailed descriptions are omitted.

As illustrated in FIG. 6, a facility manufacturing/management supporting system 10, to which the job plan display system (scheduling creation unit 5) of Embodiment 3 is applied, includes a design management system 11 in addition to an order-receiving system 1, a component table system 2, and a facility manufacturing system 3.

The design management system 11 manages the progress of design data (CAD data) created (progress information) on the basis of "operating plan or job plan on design" transmitted from the CAD system 20, the procurement system 30 or the like and "a starting signal or a completion signal of the operation or the job by the designer" that is transmitted from the performance collection system 40 or the like. This design management system 11 sets a plurality of operating or job processes relating to designing, such as "concept designing process", "details designing process" and "component table input process" for the design processing management as stated above. The system is then configured so that, when an operator inputs starting information or completion information of the operation or the job corresponding to each process with the performance collection system 40, a "started flag" or a "completed flag" is assigned to the corresponding process in the design management system 11. This design management system 11 further sets an update determination process (e.g., "concept designing process"), in which a thumbnail is allowed to updated when its operation or job is completed (i.e., a "completed flag" is assigned). The scheduling creation unit 5 of the facility manufacturing system 3 is configured to fetch such progress information on the design data created from the design management system 11, and, when a "completed flag" is assigned to the update determination process, to display or update a thumbnail in the "job bar".

Specifically as illustrated in FIG. 7, similarly to Embodiment 1 as stated above, the scheduling creation unit 5 of Embodiment 3 firstly creates a job plan for each NC machine tool on the basis of information transmitted from the component table system 2, the procurement system 30, the performance collection system 40 and the like, the job plan including a plurality of unit jobs to manufacture a production facility that manufactures products as a manufacturing target (STEP 100). Next, the scheduling creation unit 5 fetches CAD data of a product as a job target of each unit job that is created by the designer (STEP 200).

Next, the scheduling creation unit 5 fetches progress information on the design data created as stated above from the design management system 11 (STEP 330). Next, the scheduling creation unit 5 determines whether a "completed flag" is assigned to the update determination process (e.g., "concept designing process") relating to the CAD data fetched at STEP 200 in the progress information fetched at STEP 330 (STEP 331). When it is determined that no "completed flag" is assigned to the update determination process, the scheduling creation unit 5 determines that it is not the timing to update a thumbnail, and ends the procedure.

On the other hand, when it is determined that a "completed flag" is assigned to the update determination process, the scheduling creation unit 5 determines that it is the timing to update a thumbnail, and creates a display image (thumbnail) on the basis of coordinates information of the CAD data fetched at STEP 200 (STEP 400).

Then the scheduling creation unit 5 displays the thumbnail (thumbnail relating to the product as a job target of the unit job) created at STEP 400 in the "job bar" representing the unit job of the job plan created at STEP 100 (STEP 500) and ends the procedure. When any thumbnail created before exists in the "job bar", such a thumbnail is updated with the thumbnail newly created at STEP 400 for displaying.

In this way, according to Embodiment 3, a thumbnail in a "job bar" is displayed or updated on the basis of the progress information on the design data created in the design management system 11, specifically when the update determination process is completed among the processes relating to the design. This allows the thumbnail describing the feature of the product to be displayed or updated at an appropriate timing in accordance with the progress, the level of completion or the like of the design data created, and so allows an appropriate thumbnail to be displayed while suppressing an increase in system load.

Although Embodiment 3 describes the embodiment, in which one of the plurality of processes relating to the design (e.g., "concept designing process") is used as the update determination process, a plurality of processes (e.g., "concept designing process" and "details designing") can be used as the update determination process, and a thumbnail may be updated automatically every time when each update determination process is completed.

Embodiment 4

Figure 8:
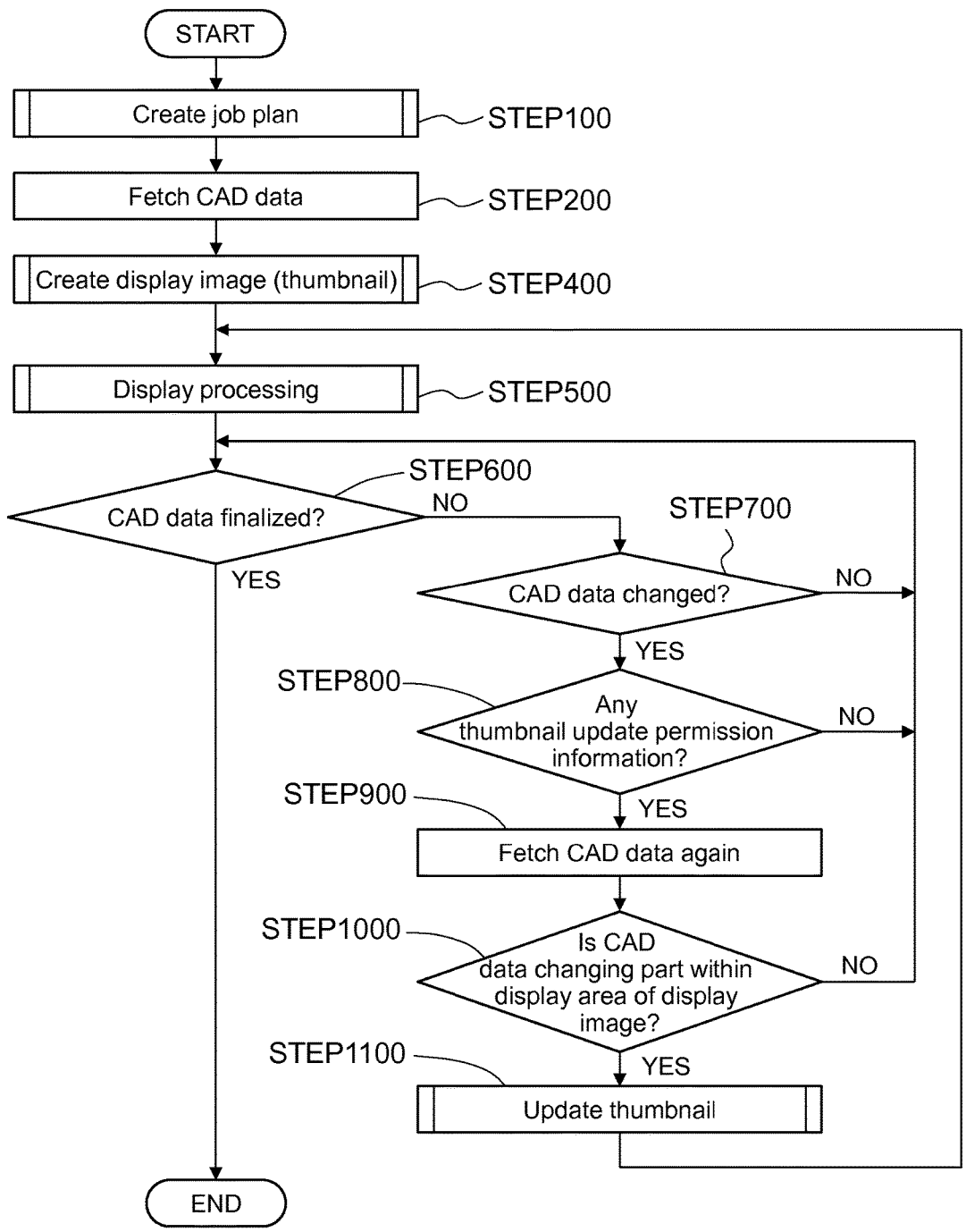
FIG. 8 is a flowchart to describe the display processing flow by a job plan display system that is Embodiment 4 of the present invention.

FIG. 8 is a flowchart to describe a display processing flow by a job plan display system (scheduling creation unit 5) that is Embodiment 4 of the present invention. Embodiment 4 is configured so that, instead of the progress information on the design data created, a determination as to whether or not to display or update a thumbnail in a "job bar" is made based on the relationship between a changing part of design data when the design data is changed and viewpoint coordinates when creating the thumbnail. The other configuration is substantially similar to that of Embodiment 3 as stated above, and so similar reference numerals are assigned to the configuration similar to Embodiment 3, and their detailed descriptions are omitted.

As illustrated in FIG. 8, similarly to Embodiment 1 as stated above, the scheduling creation unit 5 of Embodiment 4 firstly creates a job plan for each NC machine tool on the basis of information transmitted from the component table system 2, the procurement system 30, the performance collection system 40 and the like, the job plan including a plurality of unit jobs to manufacture a production facility that manufactures products as a manufacturing target (STEP 100). Next, the scheduling creation unit 5 fetches CAD data of a product as a job target of each unit job that is created by the designer (STEP 200). Next, the scheduling creation unit 5 creates a display image (thumbnail) on the basis of coordinates information of the CAD data fetched at STEP 200 (STEP 400). Then the scheduling creation unit 5 displays the thumbnail created at STEP 400 in the "job bar" representing the unit job of the job plan created at STEP 100 (STEP 500). When any thumbnail created before exists in the "job bar", such a thumbnail is updated with the thumbnail newly created at STEP 400 for displaying.

Herein the design management system 11 (see FIG. 6) of the facility manufacturing/management supporting system 10 stores information, relating to whether the design data (CAD data) has been finalized or not (i.e., the CAD data is no longer changed or updated or not) on the basis of finalizing input on the CAD data by the designer (assignment of a "CAD data finalizing flag") or progress information on the CAD data created, for example.

The scheduling creation unit 5 regularly fetches such information from the design management system 11 and determines whether the CAD data has been finalized or not (STEP 600) and when it is determined that the CAD data has been finalized, the scheduling creation unit 5 determines it unnecessary to update a thumbnail and ends the procedure.

On the other hand, when it is determined that the CAD data has not been finalized, the scheduling creation unit 5 fetches information on whether the CAD data is changed or not from the design management system 11 at a predetermined timing to determine whether the CAD data has been changed or not (STEP 700), and when it is determined that the CAD data has not been changed, the procedure returns to STEP 600.

When it is determined that the CAD data has been changed, the scheduling creation unit 5 determines whether there is any piece of thumbnail update permission information or not, such as the "thumbnail update permission flag", the update time in the "calendar information", the "completed flag" to the update determination process for progress information on the design data created in Embodiments 1 to 3 as stated above (STEP 800), and when it is determined that there is no such thumbnail update permission information, the procedure returns to STEP 600.

On the other hand, when it is determined that there is such thumbnail update permission information, the scheduling creation unit 5 fetches the CAD data that is determined to be changed at STEP 700 (STEP 900). Next, the scheduling creation unit 5 compares the original CAD data fetched at STEP 200 and the CAD data after the change that is fetched at STEP 900 to specify a changing part, and then determines whether such a changing part of the CAD data exists within a display area of the thumbnail (within the outline of the thumbnail) or not, i.e., whether the changing part of the CAD data is visible or not on the screen (STEP 1000). Herein the determination at STEP 1000 is made based on the relationship between the changing part of the CAD data and the viewpoint coordinates at the time of thumbnail creation that are set at STEP 400.

When it is determined that the changing part of the CAD data does not exist within a display area of the thumbnail, the scheduling creation unit 5 determines it unnecessary to update the thumbnail, and the procedure returns to STEP 600. On the other hand, when it is determined that the changing part of the CAD data exists within a display area of the thumbnail, the scheduling creation unit 5 determines it necessary to update the thumbnail, and creates (updates) the display image (thumbnail) on the basis of the coordinates information of the CAD data after changing that is fetched at STEP 900 (STEP 1100). Specifically the scheduling creation unit 5 converts the CAD data after changing that is fetched at STEP 900 into image information (image data) that is viewed from the viewpoint coordinates that are set at STEP 400 to create a new thumbnail, displays the thumbnail created (updated) at STEP 1100 in the "job bar" representing the unit job of the job plan created at STEP 100 (STEP 500), and updates the thumbnail in the "job bar" that is already displayed at STEP 500 with the newly created thumbnail.

In this way, according to Embodiment 4, a thumbnail in a "job bar" is displayed or updated based on the relationship between a changing part of CAD data when the CAD data is changed and viewpoint coordinates when creating the thumbnail, specifically, when the changing part of the CAD data exists within a display area of the thumbnail. This allows the thumbnail describing the feature of the product to be displayed or updated when the thumbnail has to be updated, and so allows an appropriate thumbnail to be displayed while suppressing an increase in system load.

Although Embodiment 4 describes the embodiment, in which, when it is determined that the changing part of the CAD data exists within a display area of the thumbnail, the CAD data as a whole after the changing is converted into image information to create a display image (thumbnail), a part of the CAD data after changing that is visible on the screen only may be converted into image information to create a display image (thumbnail) so as to further decrease the system load. The part of the CAD data that is visible on the screen can be specified beforehand on the basis of the viewpoint coordinates that are set when the thumbnail is created, for example.

That is a detailed description of the embodiments of the present invention. However, the present invention is not limited to the above-stated embodiments, and the design may be modified variously without departing from the spirits of the present invention defined in the attached claims.

DESCRIPTION OF SYMBOLS

1 Order-receiving system
2 Component table system
3 Facility manufacturing system
4 Process plan creation unit
5 Scheduling creation unit (job plan display system)
6 Job instruction creation unit
10 Facility manufacturing/management supporting system
11 Design management system

What is claimed is:
1. A job plan display system comprising:
a display; and
a processor programmed to:
   display a job plan on the display, the job plan including a plurality of unit jobs that are performed by a plurality of machine tools to manufacture a product;
   display a component thumbnail corresponding to at least one unit job for manufacturing the product, the component thumbnail representing image information on the product in a display area of the job plan, the image information of the component thumbnail being based on Computer Aided Drafting (CAD) design data corresponding to characteristics of the manufactured product;
   determine whether or not the component thumbnail is required to be updated based on at least one of: (i) an input command by a designer who is changing the CAD design data, (ii) a predetermined update time, (iii) progress information on the CAD design data created, and (iv) a relationship between a changing part of the CAD design data when the CAD design data is changed and viewpoint coordinates when creating the component thumbnail;
   in response to determining that the component thumbnail is required to be updated, display the updated component thumbnail in the display area of the job plan; and
   in response to determining that the component thumbnail is not required to be updated, the component thumbnail is not changed in the display area of the job plan, whereby an increase in a system load of the job plan display system is suppressed.

2. The job plan display system according to claim 1, wherein the processor is further programmed to:
   display, on the display area of the unit job of the job plan, the component thumbnail of the product as a job target of the unit job.

3. The job plan display system according to claim 2, wherein the processor is further programmed to:
   create the component thumbnail on a basis of coordinates information on the CAD design data.

4. The job plan display system according to claim 1, wherein processor is further programmed to:
   create the component thumbnail on a basis of coordinates information on the CAD design data.

5. The job plan display system according to claim 1, wherein the processor is further programmed to:
   specify viewpoint coordinates on a basis of coordinates information on the CAD design data to create the component thumbnail when the processor determines that the component thumbnail is to be displayed or updated.

6. The job plan display system according to claim 1, wherein the processor is further programmed to:
   compare the CAD design data prior to being modified and after being modified such that a changing part in the CAD design data is identified, and
   display or update the component thumbnail if the changing part is present within a display area of the component thumbnail.

7. The job plan display system according to claim 6, wherein the processor is further programmed to:
   create the component thumbnail on a basis of coordinates information on the modified CAD design data when the processor determines that the component thumbnail is to be displayed or updated.

* * * * *